(12) United States Patent
Flood, Jr. et al.

(10) Patent No.: US 8,375,551 B2
(45) Date of Patent: Feb. 19, 2013

(54) METHOD FOR COVERING AN ABOVE GROUND ACCESS OPENING TO A CONDUIT ASSEMBLY

(75) Inventors: Robert Flood, Jr., Marquette, MI (US); Jeremy Nylund, Marquette, MI (US)

(73) Assignee: Argonics, Inc., Marquette, MI (US)

( * ) Notice: Subject to any disclaimer, the term of this patent is extended or adjusted under 35 U.S.C. 154(b) by 606 days.

(21) Appl. No.: 12/586,881

(22) Filed: Sep. 29, 2009

(65) Prior Publication Data

US 2011/0072629 A1 Mar. 31, 2011

(51) Int. Cl.
B23P 11/00 (2006.01)

(52) U.S. Cl. ........................................................ 29/451

(58) Field of Classification Search ..................... 29/451, 29/428, 450, 453; 404/26; 220/3.7–3.8; 52/20
See application file for complete search history.

(56) References Cited

U.S. PATENT DOCUMENTS

| | | |
|---|---|---|
| 599,457 A | 2/1898 | Sanborn |
| 1,639,495 A | 8/1927 | Frame |
| 2,593,918 A | 4/1952 | Redman |
| 2,930,295 A | 3/1960 | Hale |
| 3,920,347 A | 11/1975 | Sauriol et al. |
| 4,536,103 A | 8/1985 | Prescott |
| 4,591,290 A | 5/1986 | Prescott |
| 4,621,941 A | 11/1986 | Ditcher et al. |
| 5,030,030 A | 7/1991 | Simmonds |
| 5,054,956 A | 10/1991 | Huang |
| 5,195,841 A | 3/1993 | Mullins |
| 5,318,376 A | 6/1994 | Prescott, Sr. |
| 5,435,662 A | 7/1995 | Brown et al. |
| 5,470,172 A | 11/1995 | Wiedrich |
| 5,564,855 A | 10/1996 | Anderson |
| 5,785,409 A | 7/1998 | Reinert, Sr. |
| 5,956,905 A | 9/1999 | Wiedrich |
| 6,196,760 B1 | 3/2001 | Sinclair |
| 6,344,137 B1 | 2/2002 | Chiang |
| 6,945,731 B1 | 9/2005 | Vait |
| 7,401,998 B2 | 7/2008 | Wilson et al. |
| 7,494,191 B1 | 2/2009 | Crites |
| 2001/0041099 A1 | 11/2001 | Kato et al. |
| 2009/0214292 A1 | 8/2009 | Crissman et al. |
| 2009/0290934 A1 | 11/2009 | Jordan et al. |

OTHER PUBLICATIONS

International Search Report for PCT/US 10/50636 (dated Nov. 29, 2010).

*Primary Examiner* — John C Hong
(74) *Attorney, Agent, or Firm* — Wood, Phillips, Katz, Clark & Mortimer

(57) ABSTRACT

A method of covering an opening through an exposed upwardly facing surface that defines an access opening to a conduit assembly defining a communication passage to a below surface location. The method includes the steps of: providing a cover assembly with a non-metallic component; and operatively joining the cover assembly with the conduit assembly so that the non-metallic component is placed against a metal component on the conduit assembly and transmits weight forces applied to at least one of: a) the exposed upwardly facing surface; and b) a surface defined by a cover component on the cover assembly that blocks the access opening and is substantially flush with the exposed upwardly facing surface, to the metal component on the conduit assembly.

22 Claims, 12 Drawing Sheets

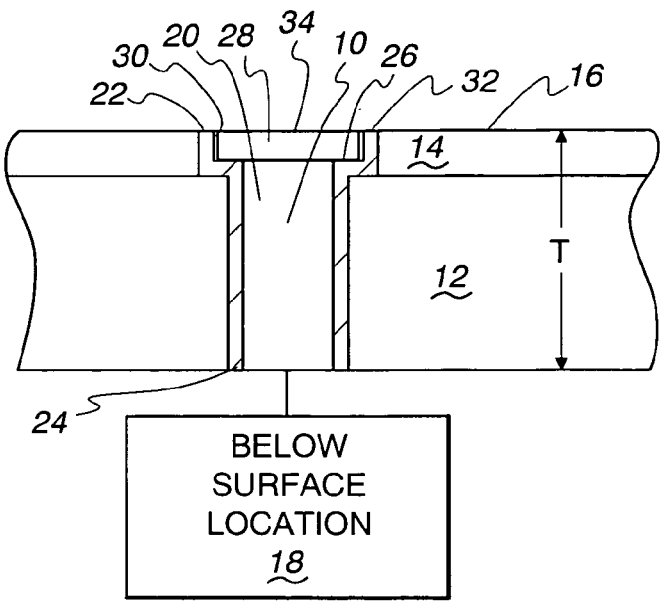
Fig. 1
(Prior Art)
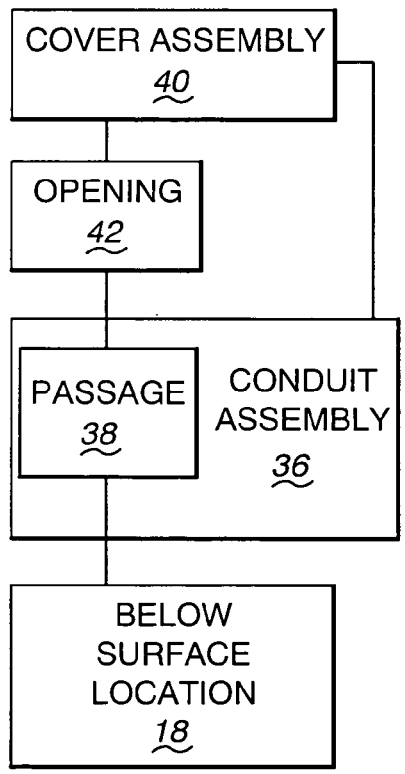
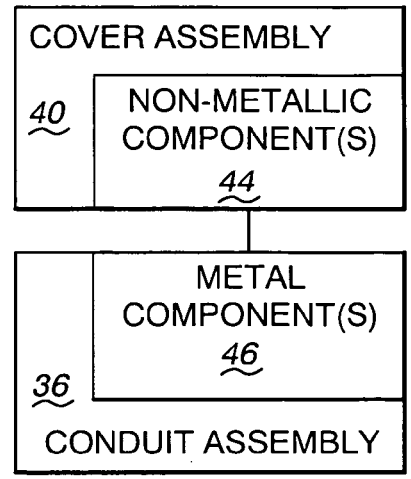

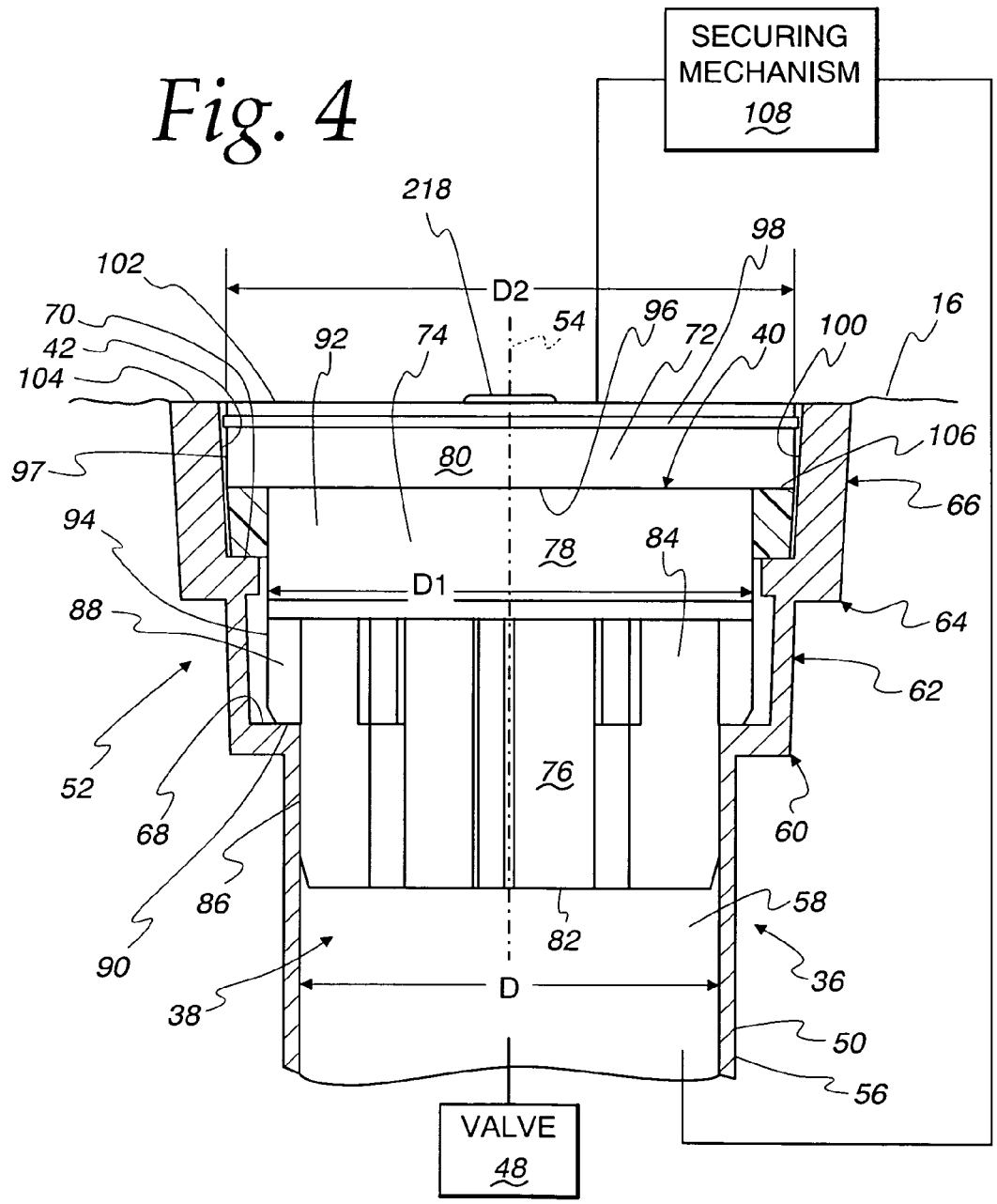

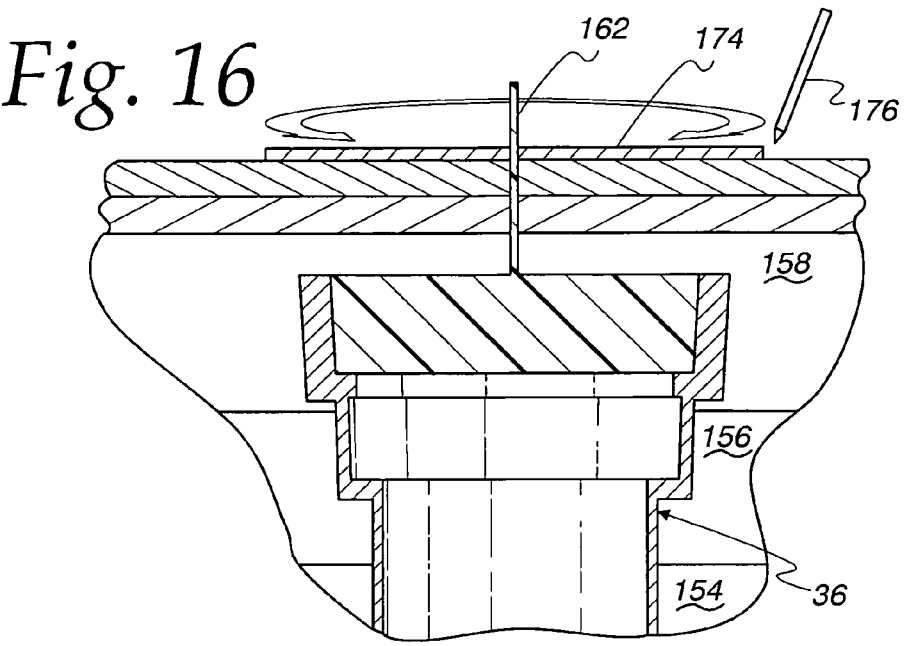
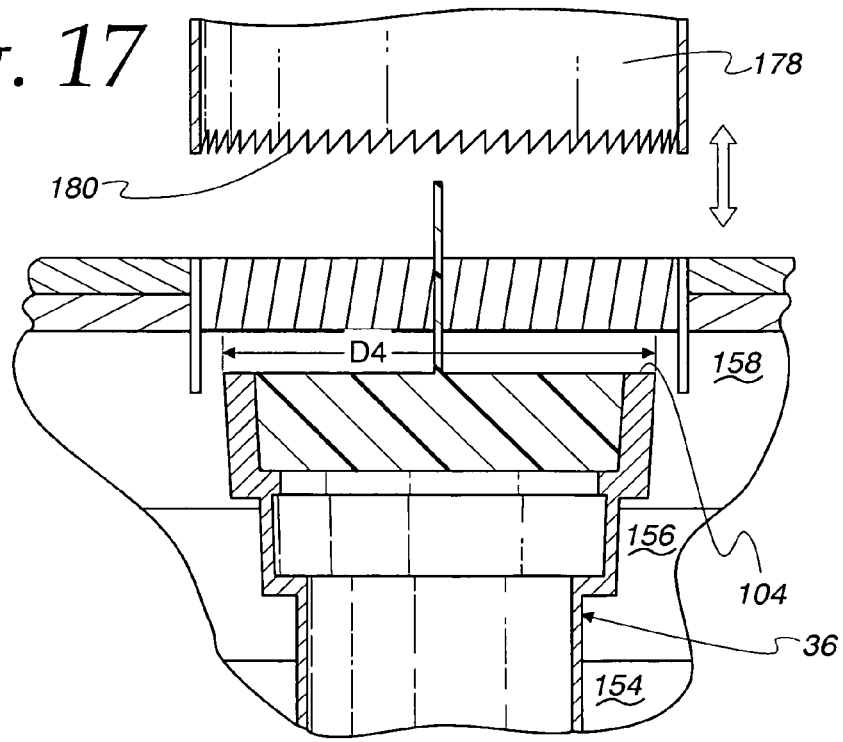

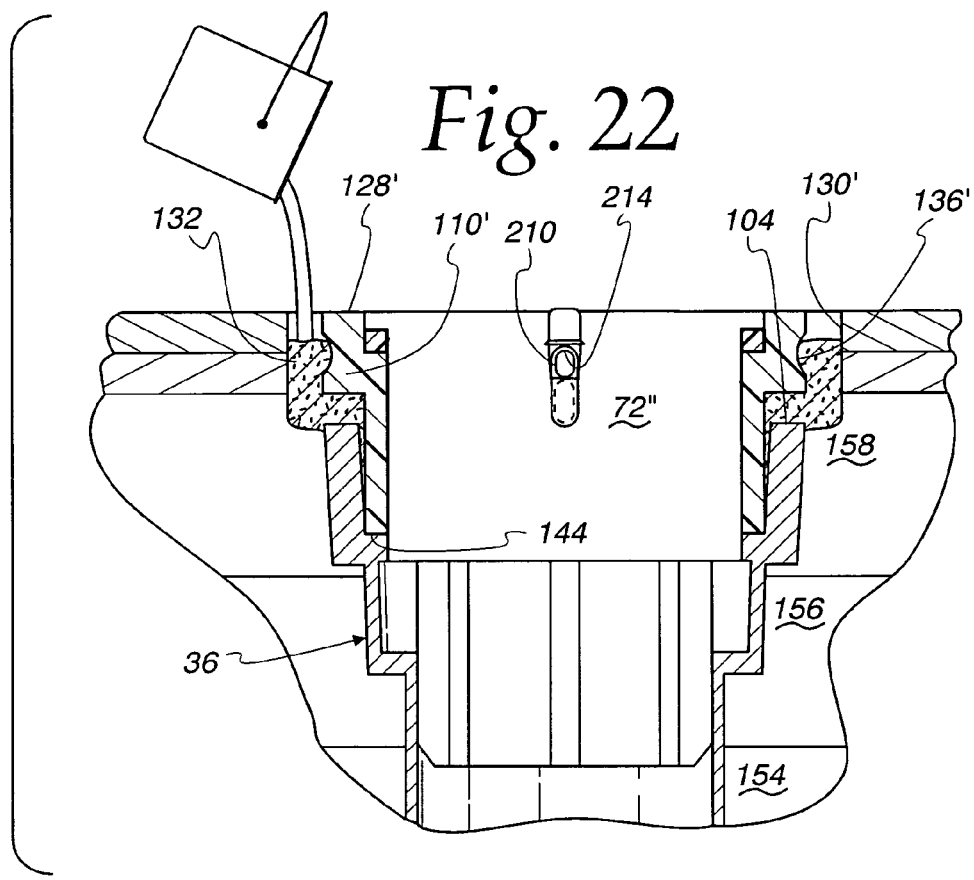
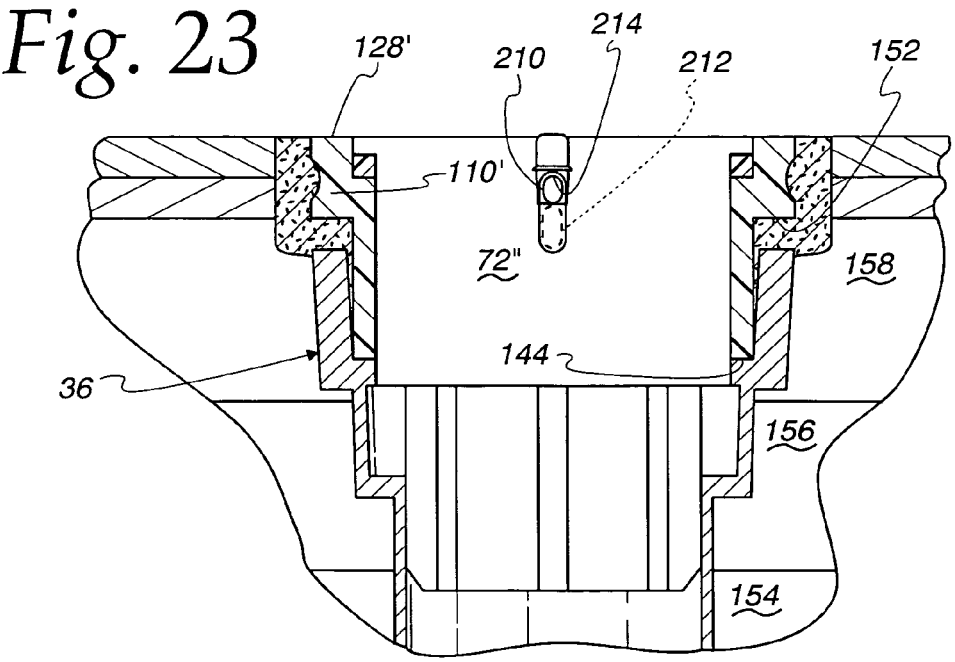

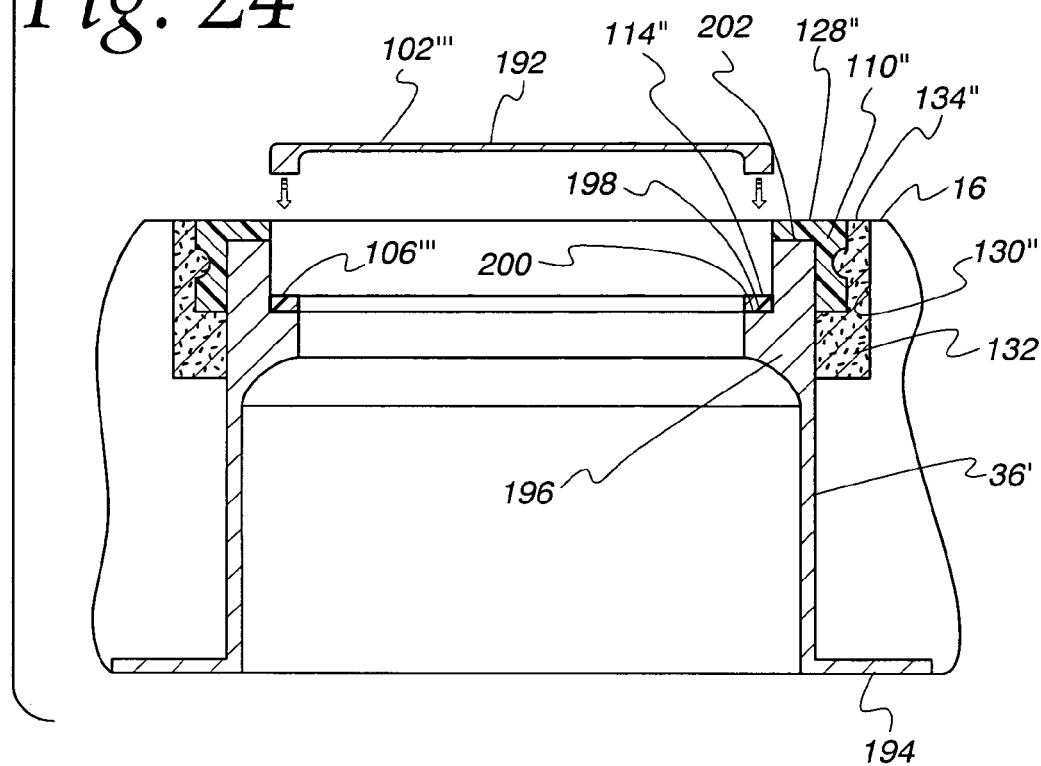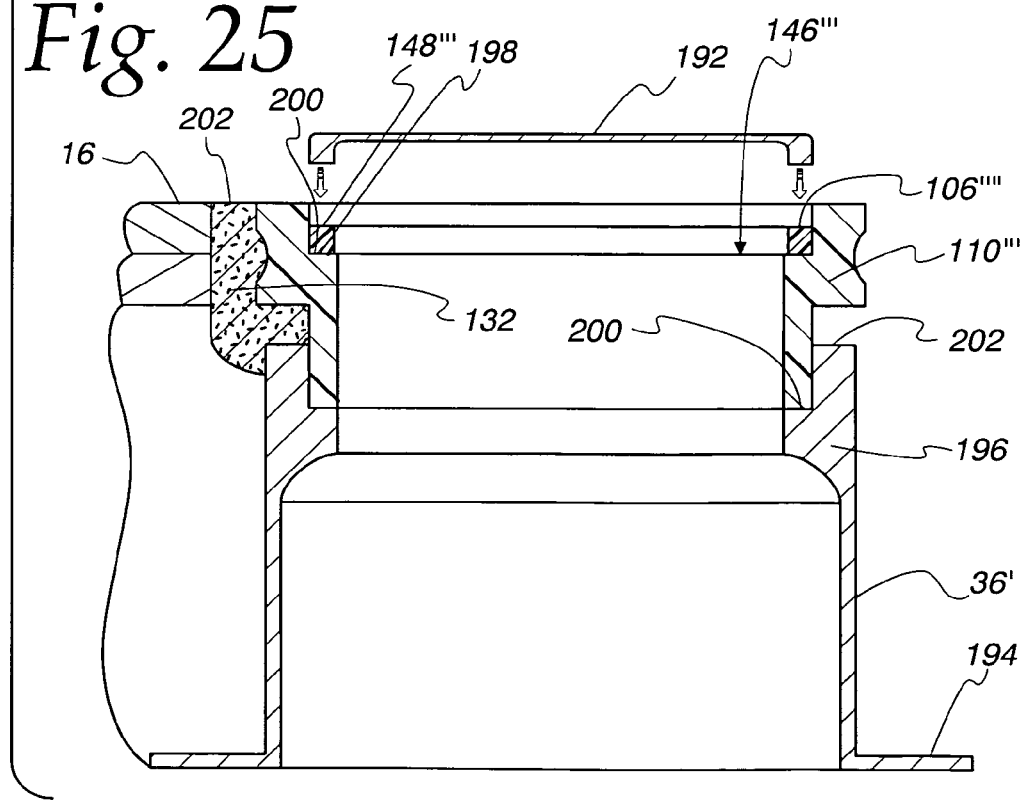

METHOD FOR COVERING AN ABOVE GROUND ACCESS OPENING TO A CONDUIT ASSEMBLY

BACKGROUND OF THE INVENTION

1. Field of the Invention

This invention relates to in-ground conduits through which above ground access can be gained to below surface objects and/or spaces and, more particularly, to a method for covering a surface opening through which access to the conduit is gained.

2. Background Art

It is common for public utilities to install wiring, conduits for communication of fluids and gases, etc., below surface grade. By so doing, the supply lines and pipes, operating components, such as valves and switches, controls, etc., are conveniently placed so that they are not visible to the public, do not interfere with surface traffic, and are not prone to being damaged and/or tampered with. Below surface objects and spaces have been in place for many decades on both public and private lands.

While below surface installations afford a great convenience to the utilities and other entities, both public and private, access to the below surface components by the controlling entities is inherently limited. It is known to install conduits that permit access to critical components and/or locations through an upper opening in the conduit. For example, control valves for buried pipes are commonly installed at below surface locations and made accessible for operation through vertical conduits. Removable covers are incorporated into the conduits to block the surface access opening to the conduit. By removing the cover, an individual can access the valve through the conduit, as to effect operation and/or or repair thereof.

Likewise, access to below surface spaces and tunnels is commonly gained through a conduit that is selectively blocked by a manhole cover. These conduits are large enough to allow individuals to pass therethrough to perform any needed below surface operations, be they in the form of installation, maintenance, adjustment, etc.

These various conduits are commonly installed on public right-of-ways, although this is not a requirement. Typically, conduits for valve access and larger conduits on which manhole covers are placed, are often seen on paved roadways. This is common since utilities will regularly install their lines/pipes, etc. beneath and along the extent of a paved highway as it is being constructed.

An objective of installers of these conduits, and covers therefor, is that the cover remain flush with the above ground surface that is exposed. Ideally, vehicular traffic can move over the covers without any sensing of their presence as would occur in the event that there is any difference in height between the cover and the road surface, be the cover either above or below the road surface.

At the time roads are initially constructed, the conduits can be incorporated so that the covers at the surface openings can be precisely situated flushly with the road surface. However, subsequent events may alter this relationship. It is not uncommon for pavement to settle over time around the conduit. Alternatively, the pavement may buckle or elevate around the same conduit. Repaving of surfaces may also change the relationship between the cover and the road surface. As one example, it is common for repaving operations to involve removal of a partial thickness of an exposed asphalt layer, which is subsequently replaced by a thicker layer that produces a step between the road surface and the cover, be it a manhole cover, a cover for a valve, etc. The difference in height may be such that the particular entity responsible for controlling the roadway chooses not to make any modification. As a result, those travelling over the roadway may sense a significant bump as vehicle wheels transition over the steps.

It is also known to provide a cover support that is separate from the conduit and that can be raised and lowered relative to the conduit, as through a threaded connection therebetween. To accommodate a variation in the road surface height, the cover support structure can be turned to be raised or lowered as required to cause the cover to flushly meet the road surface. In the former situation, there may be produced a significant gap over the compacted sub-surface layer(s) supporting the asphalt or concrete that defines the exposed road surface. This gap allows for the ingress of moisture that may cause shifting of a cover support and/or conduit under conditions wherein the moisture is repeatedly frozen and thawed. This gap may in any event create a non-uniform compaction around the cover that may cause vertical and/or lateral shifting of the conduit that produces a skewed or vertically offset alignment between the cover and road surface.

Various other makeshift procedures have been practiced to reseat the covers after roadways are broken up, repaved, or otherwise modified so as to alter the height of the upper surface thereof.

Another problem that has plagued this industry is the generation of rattling noise as manhole covers and other covers are traveled over by vehicles and thereby shifted relative to a cooperating support. For example, a manhole cover that is not flushly seated around its entire perimeter may tend to tip back and forth each time it is traveled over. As a vehicle wheel encounters one location, the cover is tipped down into contact with a metal support. Continued travel causes the diametrically opposite location to shift downwardly against the metal support such that two distinct sounds may be heard at each pass.

The industry continues its efforts to develop systems on roadways and other locations that will consistently permit flush mounting of covers at surface access openings and that can be adapted to maintain this flush relationship even when the primary surface grade is changed. The industry also continues to seek out structure that will avoid offensive rattling between metal components as vehicles move over these various covers. The industry has to date contended with the above noted problems since viable solutions thereto are not commercially available.

SUMMARY OF THE INVENTION

The invention is directed to a method of covering an opening through an exposed upwardly facing surface that defines an access opening to a conduit assembly defining a communication passage to a below surface location. The method includes the steps of: providing a cover assembly with a non-metallic component; and operatively joining the cover assembly with the conduit assembly so that the non-metallic component is placed against a metal component on the conduit assembly and transmits weight forces applied to at least one of: a) the exposed upwardly facing surface; and b) a surface defined by a cover component on the cover assembly that blocks the access opening and is substantially flush with the exposed upwardly facing surface, to the metal component on the conduit assembly.

In one form, the exposed upwardly facing surface is part of a roadway for vehicular traffic.

In one form, the step of providing a cover assembly involves providing a cover assembly with a plug component and the step of operatively joining the cover assembly involves press fitting the plug component within a surface of the conduit assembly extending around the communication passage.

In one form, the surface of the conduit assembly extending around the communication passage has a stepped diameter with vertically spaced surface portions with different diameters and the step of press fitting the plug component involves press fitting the plug component within each of the vertically spaced surface portions.

In one form, the plug component is a single molded polyurethane piece that is press fit to the surface of the conduit assembly extending around the communication passage and defines the surface that blocks the access opening and is substantially flush with the exposed upwardly facing surface.

In one form, the step of operatively joining the cover assembly involves abutting the plug component to an upwardly facing surface on the conduit assembly.

In one form, the step of operatively joining the cover assembly involves placing an annular spacer captively between vertically oppositely facing surfaces on the plug component and conduit assembly.

In one form, the step of operatively joining the cover assembly involves operatively joining the cover assembly so that the non-metallic component defines a part of the exposed upwardly facing surface.

In one form, the step of operatively joining the cover assembly involves providing a filler around parts of the non-metallic component and conduit assembly to maintain the non-metallic component and conduit assembly together.

In one form, the step of providing a filler involves providing a filler that defines a part of the exposed upwardly facing surface.

In one form, the step of operatively joining the cover assembly includes the steps of: placing a locator assembly in operative relationship with the conduit assembly; applying at least one layer of material over the conduit assembly, a part of the locator assembly, and a sub-surface around the conduit assembly: a) to define the exposed upwardly facing surface; and b) so that a part of the locator assembly is detectable to identify a location of the conduit assembly; forming the access opening through the upwardly facing surface and at least one layer; and directing the non-metallic component through the access opening to thereby place the non-metallic component against the metallic component.

In one form, the method further includes the step of separating the locator assembly from the conduit assembly.

In one form, the step of placing a locator assembly involves placing a locator assembly in operative relationship so that a portion of the locator assembly projects upwardly through the at least one layer of material.

In one form, the portion of the detector assembly projects upwardly at a vertical center line for the communication passage. The method further includes the step of using the portion of the locator assembly, that projects upwardly, to identify a location for the access opening to be formed to be concentric with the communication passage.

In one form, the step of forming the access opening involves forming the access opening using a rotary boring bit.

In one form, the step of providing a cover assembly involves providing a metallic component that defines the surface that blocks the access opening.

In one form, the step of providing a cover assembly involves providing a cover assembly with a non-metallic component made from a polyurethane material.

In one form, the step of providing a cover assembly involves providing a metal component that defines the surface that blocks the access opening and the step of operatively joining the cover assembly involves placing the non-metallic component captively between vertically facing surfaces on the metal component that defines the surface that blocks the access opening and the conduit assembly.

In one form, the step of providing a cover assembly involves providing a metal component that defines the surface that blocks the access opening and the step of operatively joining the cover assembly involves operatively joining the cover assembly so that the non-metallic component defines a part of the exposed upwardly facing surface.

In one form, the step of operatively joining the cover assembly involves providing a filler around parts of the non-metallic component and conduit assembly to secure the non-metallic component in place.

BRIEF DESCRIPTION OF THE DRAWINGS

FIG. 1 is a partially schematic, cross-sectional view of a conventional roadway having a conduit directed therethrough to access a below surface location and with a releasable cover over an access opening at the top of the conduit;

FIG. 2 is a schematic representation of the inventive cover assembly that cooperates with a conduit assembly defining a communication passage between an upper access opening and a below surface location;

FIG. 3 is a schematic representation of components cooperating between the inventive cover assembly and conduit assembly;

FIG. 4 is a cross-sectional view of one specific form of the inventive cover assembly and conduit assembly as shown in FIG. 3;

FIGS. 10-23 show sequentially the steps of operatively joining the cover assembly in FIG. 6 with the conduit assembly in that same figure wherein:
  a) FIG. 10 shows a locator assembly being directed into a communication passage on the conduit assembly;
  b) FIG. 11 shows the locator assembly in operative relationship with the conduit assembly and a roller compacting sub-surface material thereover;
  c) FIG. 12 shows the roller in FIG. 11 compacting an asphalt layer over the sub-surface material and around the locator assembly;
  d) FIG. 13 shows the locator assembly, bent downwardly by the roller in FIG. 12, being released to its initial, undeformed state;
  e) FIG. 14 shows a second asphalt layer being compacted by the roller around the locator assembly;
  f) FIG. 15 shows the locator assembly being released from the bent position in FIG. 14 to its initial, undeformed state;
  g) FIG. 16 shows a template placed with the assistance of the locator assembly to allow scribing of a concentric circle around the conduit assembly;

h) FIG. 17 shows a boring bit cutting through the asphalt layers to produce a void around the top of the conduit assembly;

i) FIG. 18 shows the locator assembly and cut portions of the asphalt layers being removed from the site;

j) FIG. 19 shows a ruler situated to measure the height of the exposed, upwardly facing surface of asphalt layer relative to the conduit assembly;

k) FIG. 20 shows a non-metallic component for supporting a plug component that defines a surface that blocks the communication passage installed;

l) FIG. 21 shows the plug component in place;

m) FIG. 22 shows a filler being placed in the void to maintain the non-metallic component and conduit assembly together and in place; and n) FIG. 23 shows the filler set and the installation completed;

FIG. 24 is a cross-sectional view of a modified form of conduit assembly that is used to support a manhole cover and with a field condition as shown in FIG. 8; and FIG. 25 is a view as in FIG. 24 with the cover assembly configured to support a manhole cover with a field condition as in FIG. 9.

DETAILED DESCRIPTION OF THE PREFERRED EMBODIMENT

Figure 5:
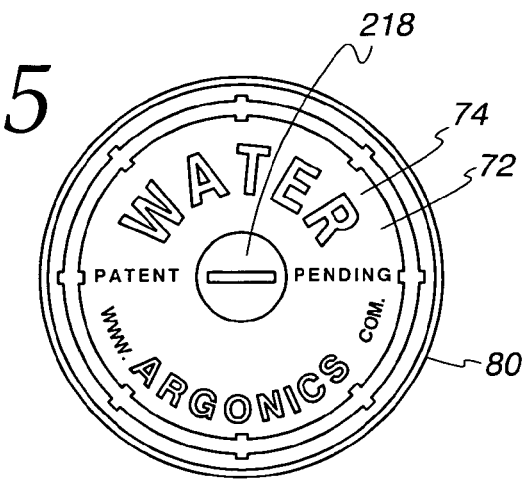
FIG. 5 is a plan view of a plug component on the cover assembly of FIG. 4.
Figure 6:
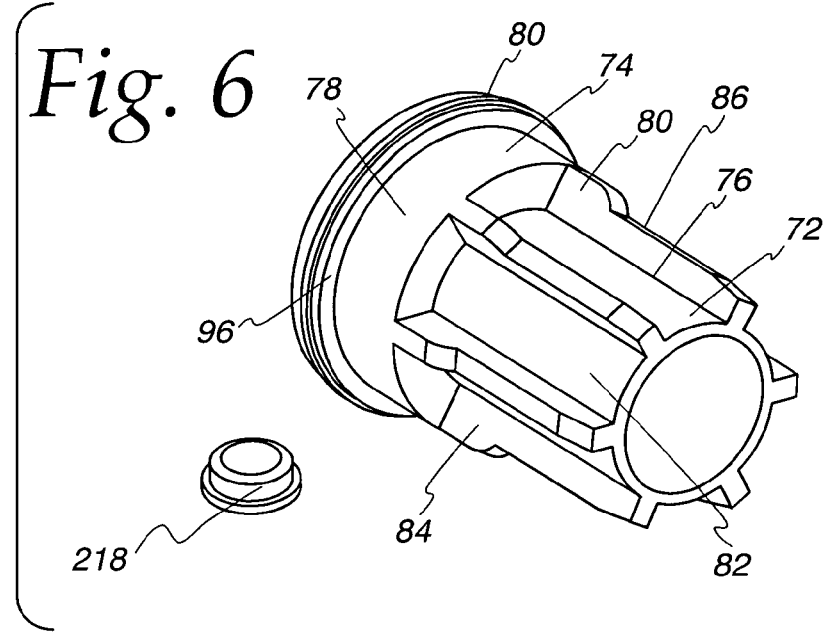
FIG. 6 is a perspective view of the plug component in FIG. 5.
Figure 7:
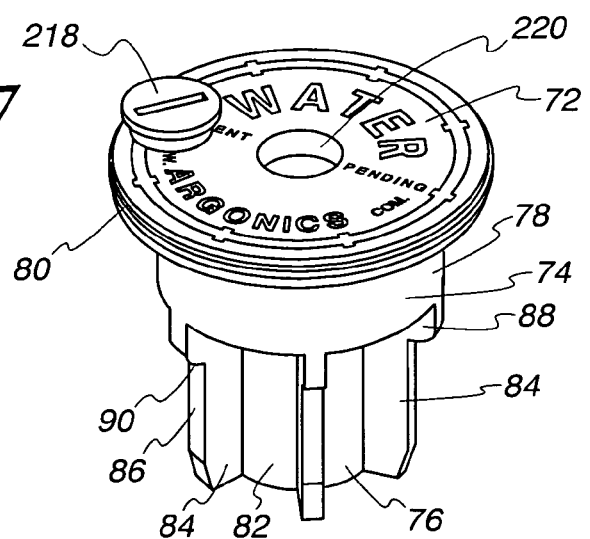
FIG. 7 is a view of the plug component in FIGS. 5 and 6 from a different perspective than in FIG. 6.

In FIG. 1, a typical, exemplary environment for the present invention is depicted. More specifically, a conduit 10 is directed vertically through a composite thickness T, typically made from at least one compacted base/sub-surface layer 12 upon which one or more layers 14 (one shown) are provided to define an exposed, upwardly facing surface 16. The layer 14 may be asphalt, concrete, or other material that produces a hard roadway surface 16 over which vehicles can conveniently travel. It is common for public utilities to provide some sort of structure and/or space at a below surface location 18 that requires access from above. The conduit 10 affords such access by defining a communication passage 20 between vertically spaced ends 22, 24 thereon.

Typically, the conduit 10 is made from one or more metal components and defines an upwardly facing, annular seat 26 that supports a cover 28 that blocks a top opening 30 through which access is gained to the passage 20.

At the top of the conduit 10, an annular surface 32 is defined that is preferably flush with the surface 16 and also with an upwardly facing surface 34 on the cover 28, with the cover 28 placed against the seat 26.

As noted in the Background portion herein, commonly the conduit 10 and cover 28 will each be made from heavy metal material. In the absence of substantially precise facial engagement between the cover 28 and conduit 10, around the full circumference of the seat 26, the cover 28 will shift and tilt under forces applied; as by heavy vehicles passing thereover. This condition may not have any-detrimental structural consequences other than the fact that it causes an offensive noise to be generated repeatedly as vehicles pass thereover.

As also noted in the Background portion, in the event that the layer 14 is resurfaced, or there is another layer applied thereto, the uppermost surface 16 may no longer be in flush relationship with the surface 32, as a consequence of which there is a step, either up or down, between the surfaces 16, 32. When the step reaches a certain vertical dimension, it is noticeably detectable by occupants of vehicles traveling thereover.

The present invention can be practiced in virtually any environment wherein a below surface location 18 is desirably accessed from above ground, as shown in FIG. 2. As noted above, the below surface location could be any location at which there are components that are required to be accessed for assembly, repair, adjustment, etc. As just one example, valves may be provided at the location 18 associated with underground conduits through which gas or liquid, such as water, is transported. Alternatively, the location 18 may have a tunnel or passageway through which an individual may navigate to access components on underground equipment, and the like.

The schematic showing of this environment in FIG. 2 is intended to encompass virtually every conceivable structure that is conventionally found at below surface locations. Further, the invention is not limited to below surface locations 18 that are directly under roadways. For example, the location 18 may be under a sidewalk, a parking lot, or under any other location, on public or private property, where components are conventionally placed and which are desirably accessed from an above ground location.

In its basic form, as shown in FIG. 2, the present invention is directed to a conduit assembly 36 that defines a communication passage 38 to the below surface location 18. A cover assembly 40 cooperates with the conduit assembly 36 and is used to cover an opening 42 through the aforementioned exposed, upwardly facing surface 16. The opening 42 defines an access opening to the communication passage 38 in the conduit assembly 36.

As shown in FIG. 3, in its simplest form, the cover assembly 40 has at least one non-metallic component 44. With the cover assembly 40 operatively joined to the conduit assembly 36, the non-metallic component 44 is placed against at least one metal component 46 on the conduit assembly 36 so as to transmit weight forces applied to at least one of: a) the exposed upwardly facing surface 16; and b) a surface defined by a cover component on the cover assembly 40 that blocks the access opening 42 and is substantially flush with the exposed upwardly facing surface 16, to the metallic component 46 on the conduit assembly.

The components in FIGS. 1-3 are shown schematically so as to encompass a multitude of variations contemplated by the present invention. Specific forms of the invention will be described below, with the understanding that they are exemplary in nature only and do not represent the full scope of structures contemplated within the schematic showings in FIGS. 1-3.

In FIGS. 4-7, one specific form of the invention is shown. The construction of the conduit assembly 36 shown therein is typical of ones used by public utilities to access a below surface valve 48. More specifically, the conduit assembly 36 has a body 50 with a generally cylindrical shape and stepped inner and outer diameters at its upper region 52. The body 50 has a central axis 54 with a main section 56 having an inner surface 58 bounding part of the communication passage 38. The diameter D of the passage 38 is constant over the axial extent of the main section 56.

It should be noted that when reference is made throughout to "diameter", this terminology is intended to encompass round shapes and non-round shapes which have an "effective diameter".

The main section 56 transitions at a step 60 to a larger diameter section 62, which in turn transitions at a step 64 to a still further larger diameter section 66. At the step 60, an upwardly facing annular surface 68 is defined within the passage 38, with a like, annular surface 70 defined at the step 64. The entire conduit assembly 36 is shown made as one metal piece. However, commonly these conduit assemblies are made with threadably connected parts that allow the vertical lengths thereof to be selectively changed. Further, different "step" configurations currently exist for these conduit assemblies. As one example, the step 60 is not always present, whereby there is only a single step provided. The principles of operation of the present invention are the same, regardless of the number of steps that might, for example, exceed two in number.

In this embodiment, the cover assembly 40 consists of a plug component 72 that is operatively joined with the conduit assembly 36 by being press fit into, and frictionally held within, the conduit assembly 36. The plug component 72, while potentially being made from a plurality of components, in the depicted embodiment is made as one molded piece that defines a body 74 with three distinct sections 76, 78, 80.

The section 76 consists of a core 82 from which ribs 84 project radially outwardly at regular circumferential intervals therearound. Each rib 84 has an outer edge 86 and an upper, radial extension 88. The edges 86 on the ribs 84 collectively define a diameter that is slightly greater than the diameter D of the surface 58 so that the ribs 84 will: a) compress slightly radially inwardly as the plug component 72 is pressed downwardly into the FIG. 4 position; and b) frictionally maintain the operatively joined relationship of FIG. 4.

At the transition between the edges 86 and the extensions 88, a downwardly facing edge 90 is defined on each rib 84. With the plug component 72 in the FIG. 4 position, the edges 90 each seats against the annular surface 68 to thereby establish the vertical position of the operatively joined plug component 72 within the communication passage 38.

The section 78 has an outer surface 92 with a substantially uniform diameter D1 equal to that defined cooperatively by the outer edges 94 on the extensions 88 on the ribs 84.

The section 80 has a diameter D2 that is greater than the diameter D1, whereby an annular, downwardly facing surface 96 is defined on the section 80 at the axial juncture of the sections 78, 80. The section 80 has an annular outer surface 97 with a projecting annular bead 98 mid-height thereon.

The section 80 is designed to be press fit into the communication passage 38, and frictionally maintained therewithin, by the surface 100 on the section 66. The surface 100 is tapered slightly so that its diameter decreases in a downward direction.

As the plug component 72 is directed downwardly from an initially separated position, the ribs 84 will be squeezed into the conduit section 56 at the same time the plug component section 80 is squeezed into the communication passage 38 at the surface 100. In the process, the bead 98 is progressively squeezed and deformed in a radial direction to generate a localized frictional force that maintains the plug component 72 positively within the communication passage 38. The outer surface 97 itself may also be progressively squeezed by the surface 100 during the assembly process.

The plug component 72 can be configured so that the surface 96 abuts to the surface 70 simultaneously as a surface, defined cooperatively by the edges 90 on the ribs 84, contacts the surface 68. In that state, the top surface 102 on the plug component 72 flushly aligns with the surface 16. In this embodiment, the top, annular edge 104 of the conduit assembly 36 is also flush with the surfaces 16, 102.

In this particular embodiment, with the edges 90 seated against the surface 68, the surface 96 on the plug component 72 is spaced upwardly from the surface 70 on the conduit assembly 36. To provide additional reinforcement to the plug component, the conduit assembly 36 includes an annular spacer 106 that is captive between the vertically oppositely facing surfaces 70, 96, respectively on the conduit assembly 36 and plug component 72. The annular spacer 106 may be made from a metal or non-metal material, and is preferably made from a non-metal material, such as polyurethane.

Whereas the plug component 72 is shown press/compression fit and frictionally maintained together with the conduit assembly 36 and vertically supported thereby at two axially spaced locations, it is contemplated that the plug component 72 could be vertically supported and/or frictionally held at only one of these locations.

For example, if it was desired to raise the plug component 72 further than shown in the FIG. 4 embodiment, a spacer 106 with a greater vertical extent could be utilized, which would result in the edges 90 on the ribs 84 being vertically spaced from the surface 68.

Similarly, the spacer 106 could be eliminated whereby the vertical support, aside from the frictional forces, is provided by the cooperation of the edges 90 and surface 68.

The plug component 72 may be maintained in the operatively joined position solely by the aforementioned frictional forces between the plug component 72 and conduit assembly 36. Alternatively, a securing mechanism 108, of any well known design, might be incorporated as to more securely maintain the engagement of components and/or prevent unauthorized separation of the plug component 72.

With the depicted plug component 72, it is possible to simply press fit the same into the communication passage 38, as in the event of the theft of the original metal cover. The use of spacers 106 having different vertical dimensions makes possible a significant range of vertical mounting positions for the plug component 72 relative to the conduit assembly 36.

Additionally, by reason of the plug component 72 and spacer 106 being made from a non-metallic material, such as polyurethane, on site reconfiguration of these components is possible without significant inconvenience. For example, an installer might cut or grind the non-metallic material to adapt it to a particular field condition or construction of the cooperating conduit assembly 36.

At the same time, in this embodiment there is no requirement of metal-to-metal component contact on the cooperating plug component 72 and conduit assembly 36. Each of the sections 76, 80 is made from a non-metallic material where they contact the conduit assembly 36. Likewise, the spacer 106 is preferably made from a non-metallic material where it contacts the conduit assembly 36 so that noise generation and wear resulting from typical metal-to-metal contact are avoided.

The non-metallic construction of the plug component 72 in the depicted configuration also makes possible a sealed entryway that blocks passage of above ground contaminants into the passage 38.

Another advantage of the non-metallic construction for the plug component 72 is that the plug component 72 is not as prone to being frozen in place compared to metal covers that are conventionally used. That is, the non-metal material remains sufficiently pliable to be easily extracted, even under freezing and wet conditions. Still further, the non-metallic construction makes the plug component 72 a less attractive target for thieves.

At the same time, polyurethane material will maintain its integrity under all environmental conditions and is capable of standing up to all anticipated loading in use.

Figure 8:
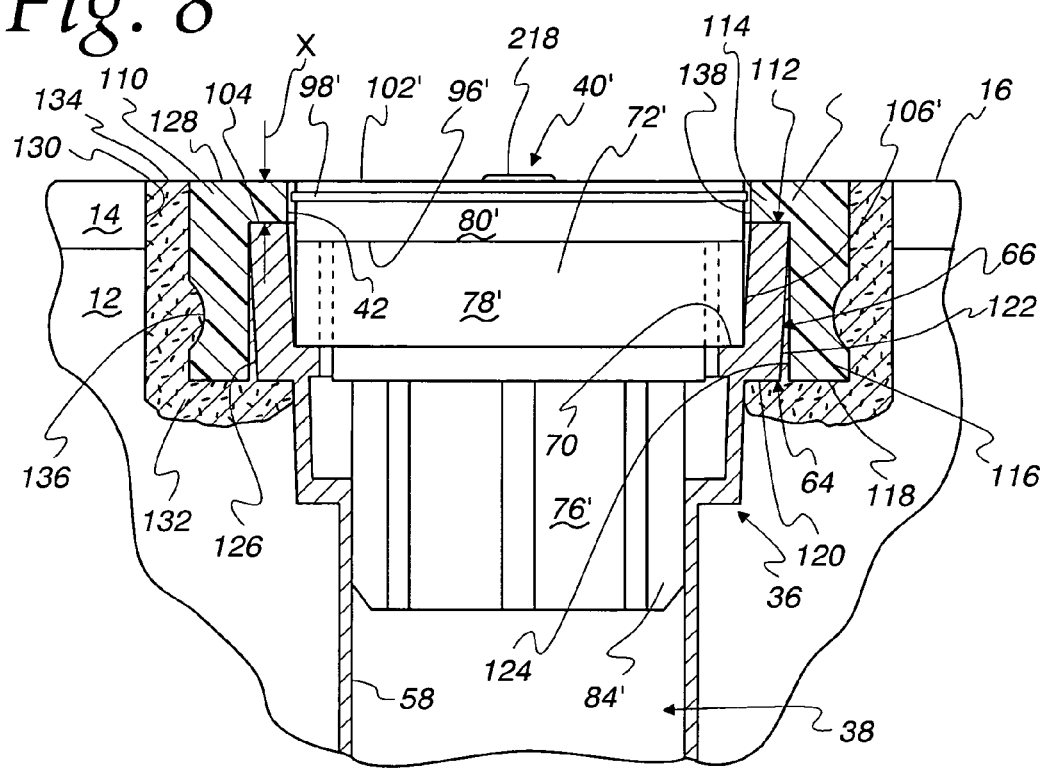
FIG. 8 is a view as in FIG. 4 with a modified form of cover assembly, according to the present invention, cooperating with the conduit assembly in FIG. 4.

In FIG. 8, a modified form of plug component 72' is part of a cover assembly 40' and is shown operatively joined to the aforementioned conduit assembly 36. The primary difference between the systems shown in FIGS. 4 and 8 is that the surface 16 is a substantial distance above the edge 104, whereas in FIG. 4 the surface 16 and edge 104 are substantially flush in a vertical direction.

The plug component 72' has sections 76', 78', 80' correspondingly consecutively to the sections 76, 78, 80 on the plug component 72. The section 76' differs from the section 76 by reason of there being no extensions on the ribs 84', as shown at 88 in FIG. 4. The ribs 84' are frictionally press fit within the communication passage 38 against the surface 58 extending therearound.

An annular spacer 106' is captively interposed between the surface 70 on the conduit assembly 36 and the annular surface 96' at the lower end of the plug component section 80'. The spacer 106' has a greater vertical extent than the spacer 106, whereby the top surface 102' is spaced above the top edge 104 of the conduit assembly 36, so as to be flush with the surface 16. Typically, this projection is a distance X that may be on the order of ¼ inch.

A separate non-metallic component 110, and one preferably made from polyurethane, or an elastomer, is operatively placed to fill the vertical gap 112 between the edge 104 and surface 16. More particularly, the component 110 has an annular shape with a rim 114 that rests upon the edge 104 and a depending skirt 116 that wraps around the section 66 on the conduit assembly 36 so that a lower edge 118 thereon is at approximately the same vertical level as the downwardly facing edge 120 at the location of the step 64 on the conduit assembly 36. The lower edge 118 could, however, be above or below the edge 120.

The outer surface 122 of the section 66, and surrounding surface 124 on the skirt 116, are relatively configured so that a slight gap 126 is defined therebetween that enlarges slightly from top to bottom over the location where the surfaces 122, 124 are in vertical coincidence.

With the component 110 operatively joined to the conduit assembly 36, the top 128 thereof defines part of the surface 16 in which the access opening 42 is defined. That is, the top 128 is substantially flush with that portion of the surface 16 defined by the layer or layers 14 atop the base/sub-surface layer 12.

As part of the process for operatively joining the cover assembly, the layers 12, 14 are removed around the perimeter of the skirt 116 to define a temporary void 130 that extends to below the edges 118, 120 on the skirt 116 and section 66 on the conduit assembly 36.

To complete the process, a pourable filler 132, such as grout, is directed into the void 130 to fill the same to the level of the remainder of the surface 16. The top portion 134 of the set filler 132 thus becomes a part of the surface 16 through which the access opening 42 is defined. Once set, the filler 132 maintains the component 110 and conduit assembly 36 together.

The component 110 and conduit assembly 36 are configured so that the filler 132 will effect a positive locking between these components. The filler 132 migrates into the gap 126 and flows around the edge 120, which thus blocks upward movement of the set filler 132. To enhance the securement of the component 110, the skirt 116 thereon is configured to define a holding notch 136 into which the filler 132 likewise migrates. Accordingly, the set filler 132 positively interlocks the component 110 and conduit assembly 36.

In this embodiment, the plug component 72' includes a bead 98' that is compressed within, and frictionally held against, a surrounding surface 138 defined by the rim 114 on the component 110.

As with the system shown in FIG. 4, the system in FIG. 8 may be constructed so that there is no metal-to-metal contact between the cover assembly 40' and the conduit assembly 36.

Figure 9:
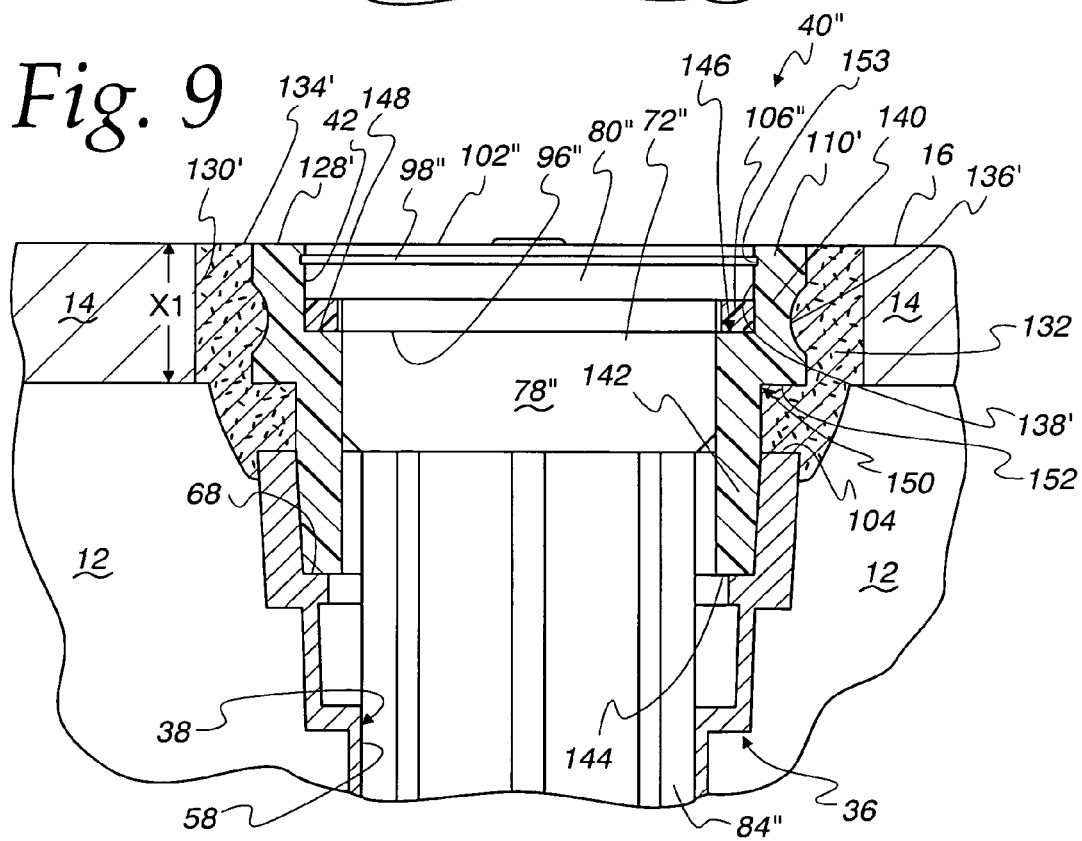
FIG. 9 is a view as in FIGS. 4 and 8 of a further modified form of cover assembly, according to the invention, cooperating with the conduit assembly in FIGS. 4 and 8.

A further modified form of cover assembly is shown at 40" in FIG. 9. The cover assembly 40" functions similarly to the aforementioned cover assemblies 40, 40', with the primary distinction being that the cover assembly 40" is designed to accommodate a field condition wherein the surface 16 is several inches above the top edge 104 of the conduit assembly 36.

In this embodiment, a non-metallic component 110', corresponding generally to the component 110, is modified to provide vertical support for the plug component 72", with the top surface 102" thereon elevated significantly further above the top edge 104 of the conduit assembly 36.

The plug component 72" is made substantially the same as the plug component 72', with the primary difference being that the ribs 84" have a greater axial extent to axially coincide with, and frictionally engage, the surface 58 surrounding the communication passage 38.

The condition shown in FIG. 9 may be the result of at least one thick asphalt surface layer 14 applied atop the base/sub-surface layer 12. The layer 14 may have a vertical dimension X1 on the order of three inches.

The component 110' has a main body 140, corresponding generally to the aforementioned skirt 116 on the component 110, and an annular rim 142, depending from the main body 140, and having a bottom edge 144 that is supported upon the surface 68 on the conduit assembly 36.

The main body 140 defines a receptacle 146 for the section 80", corresponding to the aforementioned sections 80, 80' on the plug component 72, 72'. The receptacle 146 is bounded by an annular, upwardly facing edge 148. An annular spacer 106" is captively interposed between the edge 148 and the annular surface 96" on the section 80". The spacer 106" has a vertical extent selected to place the top surface 102" in a vertically flush relationship with the surface 16 with the plug component 72" operatively joined to the conduit assembly 36.

As in the embodiment shown in FIG. 8, a void 130' is formed around the component 110' and the upper region of the conduit assembly 36. A filler 132 is poured into the void 130' and surrounds and embeds the component 110'. A step 150 at the juncture between the main body 140 and rim 142 defines a downwardly facing surface 152 against which the filler 132 is conformed. The filler 132 is thus positively blocked against upward movement relative to the component 110'. To enhance the bonding of the filler 132 to the member 110', a notch 136' is formed, as in the embodiment shown in FIG. 8, for the same purposes explained with respect thereto.

As in the embodiment in FIG. 8, the top 128' of the component 110' and top part 134' of the set filler 132 each becomes part of the top surface 16 through which the access opening 42 is defined.

In this embodiment, a bead 98" is compressed against a surface 138' on the component 110' to frictionally reinforce the connection of the plug component 72" to the component 110'. As depicted, a complementary notch 153 can be formed in the main body 140 so that the bead 98" can be snap-fit thereinto. This snap-fit feature may be provided in all embodiments disclosed herein.

While the spacer 106" is shown with a vertical dimension that may be on the order of one-half inch, this dimension might be changed, or the spacer 106" may be altogether eliminated, to extend the possible range of vertical positioning for the top surface 102".

One specific method of operatively joining the cover assembly 40" with the conduit assembly 36 is shown in FIGS. 10-23. In one exemplary installation, the conduit assembly 36 will be set in a sub-surface layer of sand, as indicated at 154, which is typically covered by a layer of 3" minus material at 156, which in turn is typically covered by a layer of 22A material at 158. These materials are compacted around the conduit assembly 36 so that the top of the layer 158 is approximately one inch above the top edge 104 of the conduit assembly 36, as indicated at X2 in FIG. 11. It should be noted that each site may be under the control of a governmental authority that has its own regulations that pertain to such installations. The described sub-surface makeup is intended to be only exemplary of one typical installation. The specific sub-surface composition is not critical to the present invention.

Figure 10:
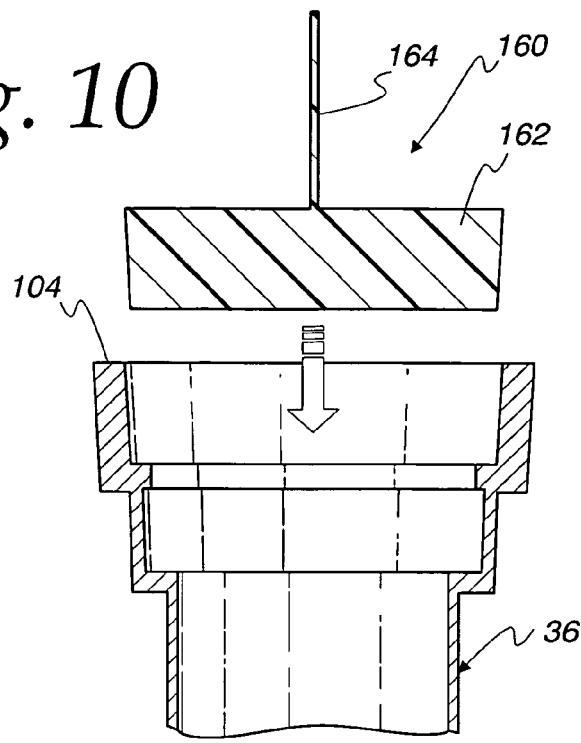
Figure 11:
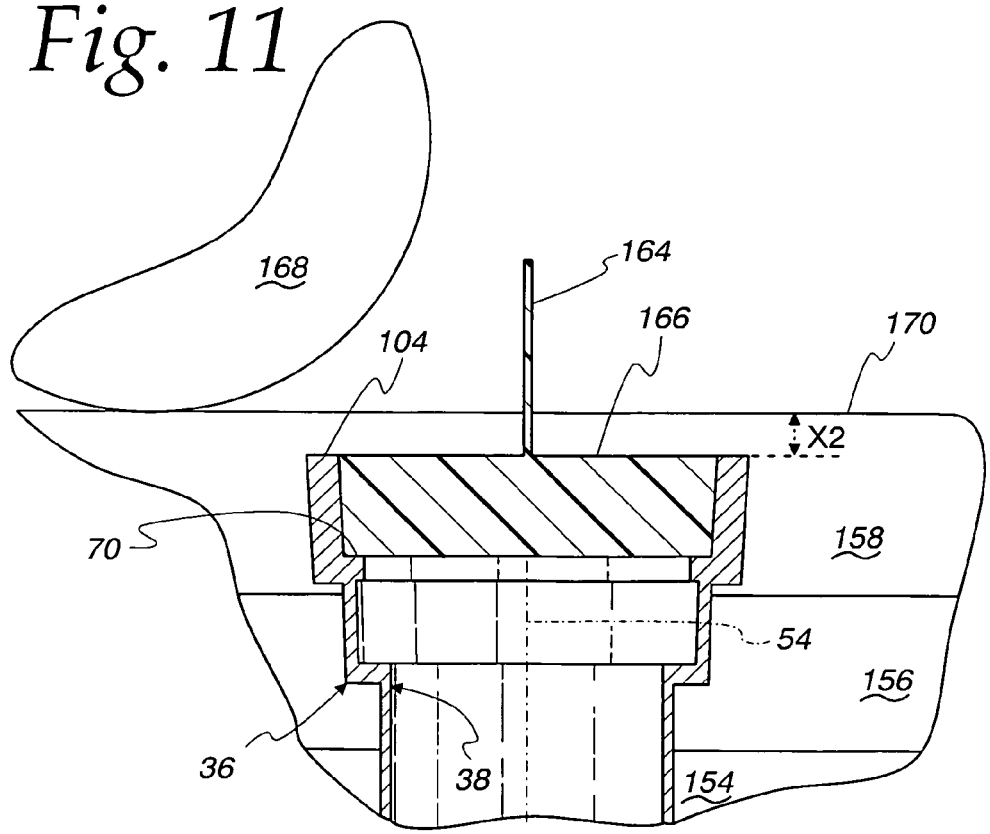

As shown in FIG. 10, before the upper material layer 158 is laid, a locator assembly 160 is placed in operative relationship with the conduit assembly 36. The locator assembly 160 is in the form of a cap 162 with an elongate part 164 projecting vertically upwardly therefrom a substantial distance. The part 164 is flexible to permit bending about its length. The cap 162 is moved from a separated position in FIG. 10 to the operatively joined position in FIG. 11, wherein the cap 162 nests within the communication passage 38 at the upper region thereof and against the annular surface 70 thereon. In this position, the top surface 166 of the cap 162 is substantially flush with the top edge 104, with the lengthwise center of the elongate part 164 concentric with the central axis 54 of the conduit assembly 36.

The material in the layer 158 is then applied and compacted through conventional equipment, such as a roller 168. This compresses the material 158 to the distance X2 above the edge 104 and top surface 166. As noted, the distance X2 is preferably on the order of one inch. As the roller 168 moves against the upper surface 170 of the material in the layer 158, the locator part 164 is allowed to bend downwardly under the force of the roller 168 and tends to spring back to an undeformed state, when the force of the roller 168 is removed.

Figure 12:
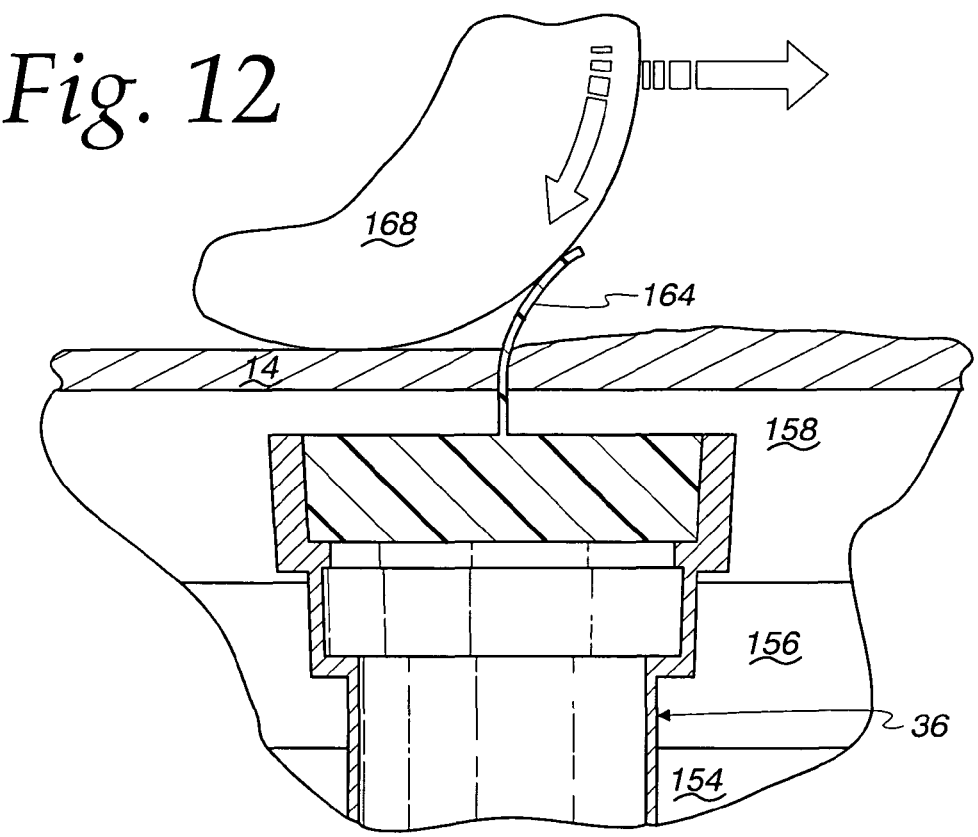
Figure 13:
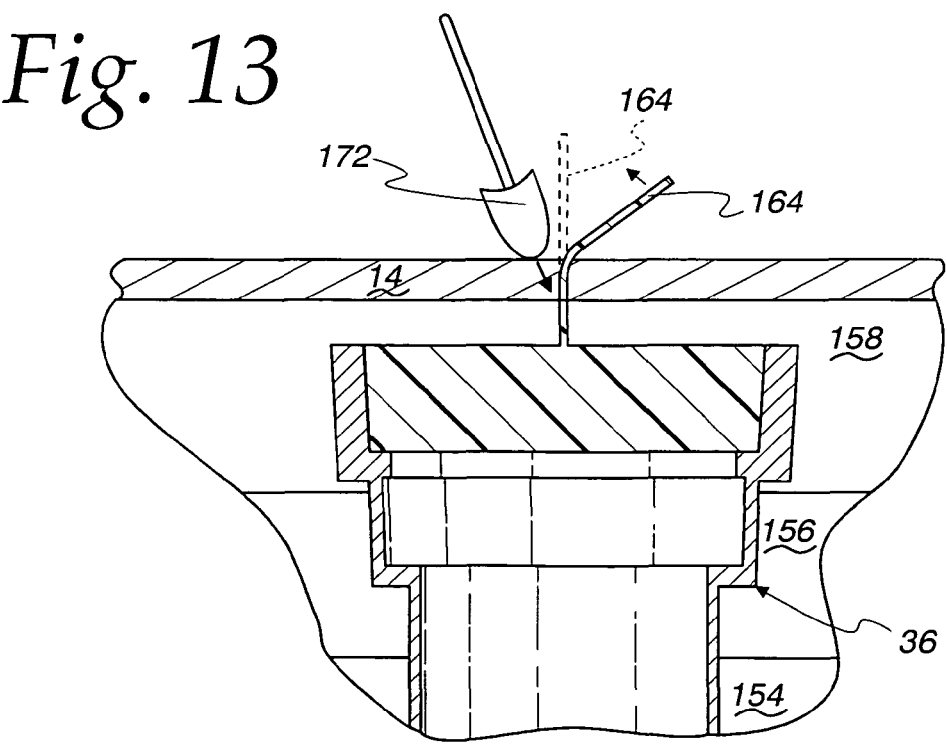

Thereafter, as shown in FIG. 12, an asphalt layer 14 is applied and compacted through the roller 168. An exposed, upwardly projecting portion of the cap part 164 again is bent under the weight of the roller 168 and tends back towards its vertical configuration when this roller force is removed, but may have a residual bend, as seen in FIG. 13 from the undeformed state shown in dotted lines. As shown in FIG. 13, if the residual bend is present, the asphalt in the layer 14 can be broken up in the vicinity of the cap part 164 to allow the cap part 164 to move fully back to the initial, undeformed position, as shown in dotted lines. In FIG. 13, a shovel 172 is shown as an exemplary suitable instrument to break loose the asphalt around the cap part 164 to allow it to "spring back".

Figure 14:
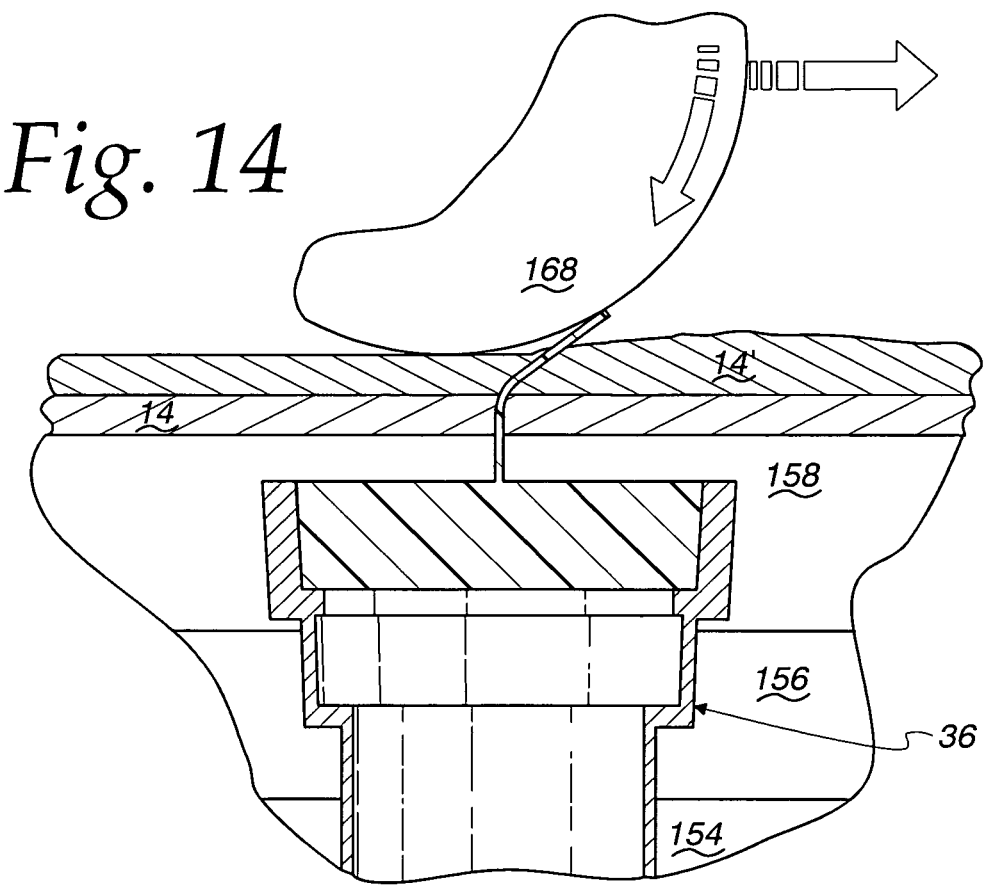
Figure 15:
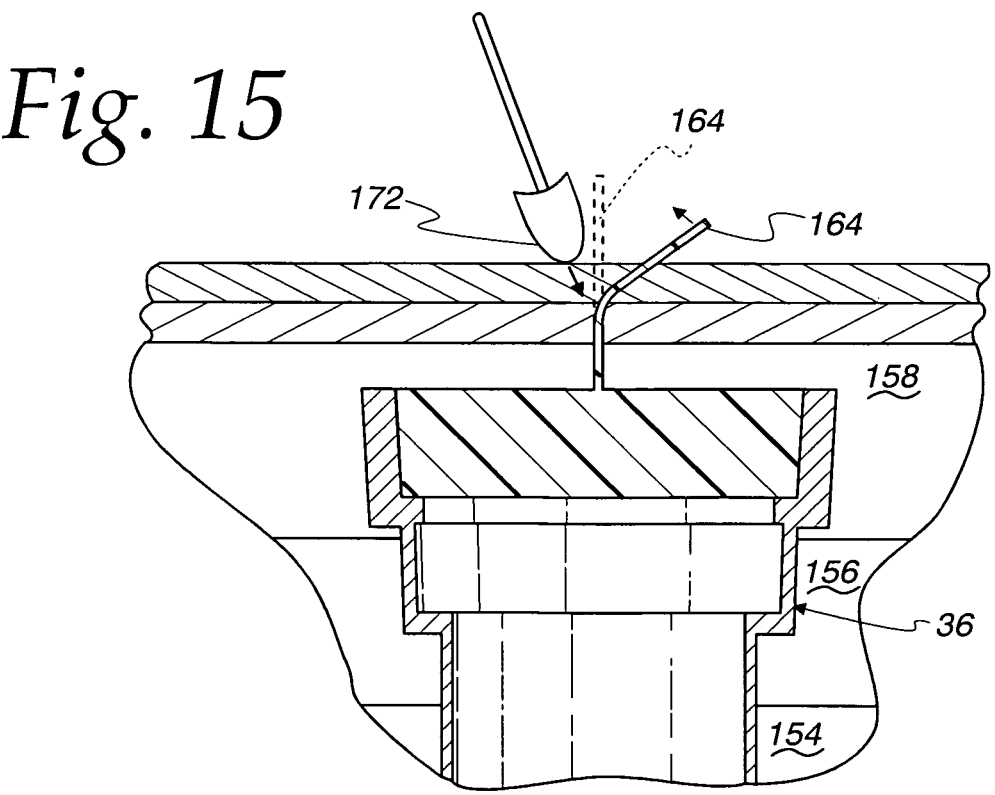

A second asphalt layer 14' is applied over the first asphalt layer 14 and compacted using the roller 168. As shown in FIG. 14, the cap part 164 bends under the weight of the roller 168 and may be again freed, as by a digging action using the shovel 172, as shown in FIG. 15, to spring back fully to its original, dotted line position in FIG. 15.

Figure 18:
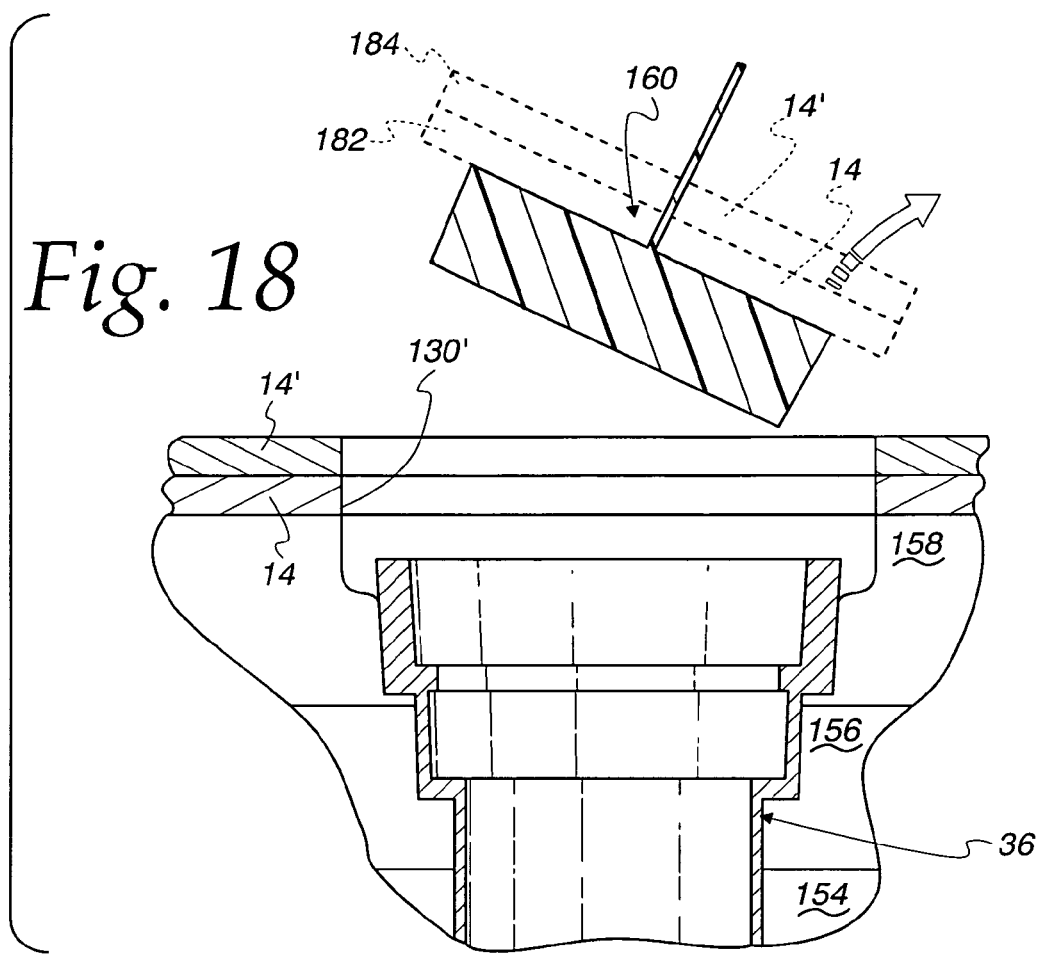

As shown in FIG. 16, a round template 174 is placed concentrically over the conduit assembly 36, with the alignment made possible utilizing the projecting portion of the cap part 162. Using the template 174, a circle can be scribed using an appropriate marker 176. The resulting circle guides placement of a boring bit 178, shown in FIG. 17. The boring bit 178 has an annular cutting edge 180 with a diameter that is greater than the diameter D4 of the outside extremity of the edge 104 on the conduit assembly 36. The bit 178 is advanced downwardly to form the void 130'. Once the boring occurs to the appropriate depth, the locator assembly 160 is removed, as shown in FIG. 18, together with the sub-surface material in the layer 158 and disc-shaped portions 182, 184 of the layers 14, 14' separated by the boring bit 178.

Figure 19:
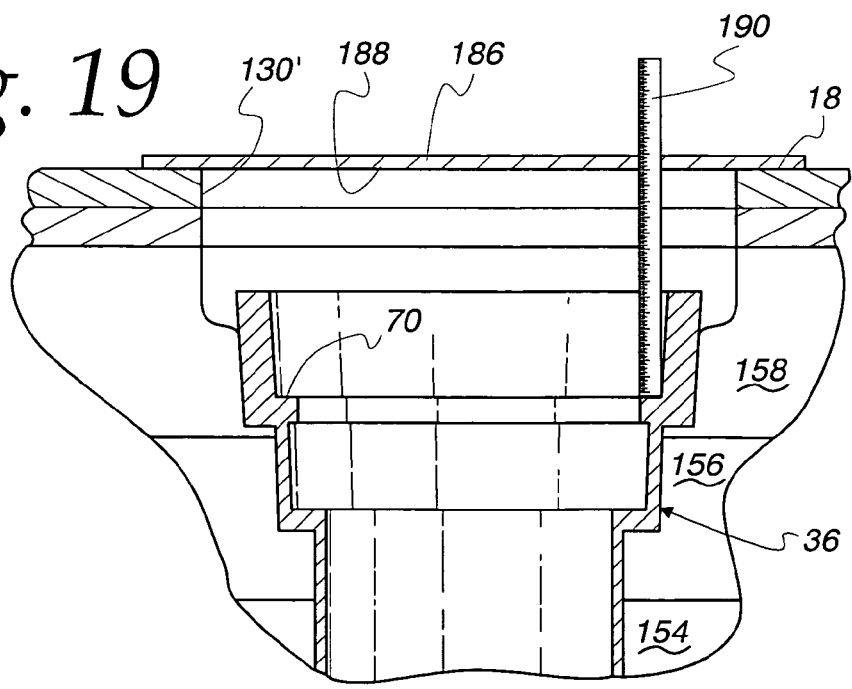

As shown in FIG. 19, a component 186 with a straight bottom edge 188 is placed so that the bottom edge 188 spans the void 130'. This facilitates measurement with a ruler 190 of the vertical spacing between the annular surface 70, against which the rule 190 is supported, and the bottom edge 188 that is at the height of the surface 18. The distance between the top 128' and bottom edge 144 on the component 110' is matched to that measurement. This matching can be effected by molding the component 110' to those dimensions or by cutting/grinding a generic construction that is designed to be fit on site, as by grinding the bottom edge 144, or otherwise reconfiguring the component 110' to adapt to a particular installation or field condition.

To facilitate on site adaptation, the component 110', and other non-metallic components described herein, may be made nominally larger than necessary for most applications. This permits a single part to be reconfigured over a range of sizes and shapes to meet a range of different field conditions. As an example, the component 110' may be made 1-2" longer than required for applications. The bottom edge 144 can be cut/ground on site to produce the required vertical dimension.

Figure 20:
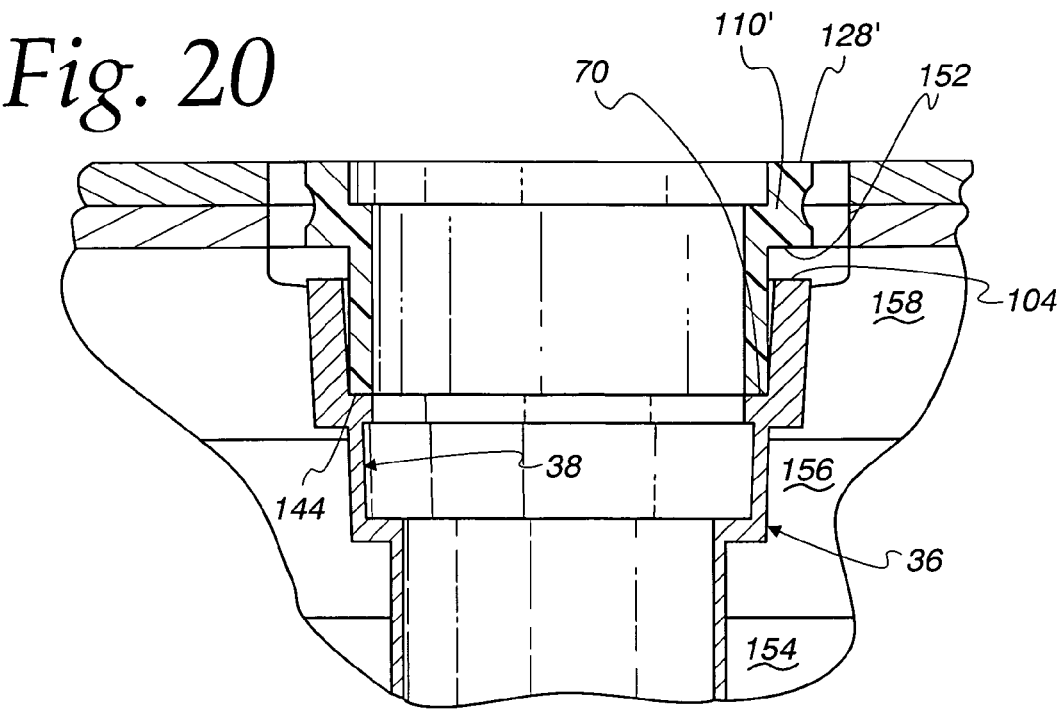

As shown at FIG. 20, the component 110' is put in place on the conduit assembly 36, borne upwardly by the annular surface 70.

Figure 21:
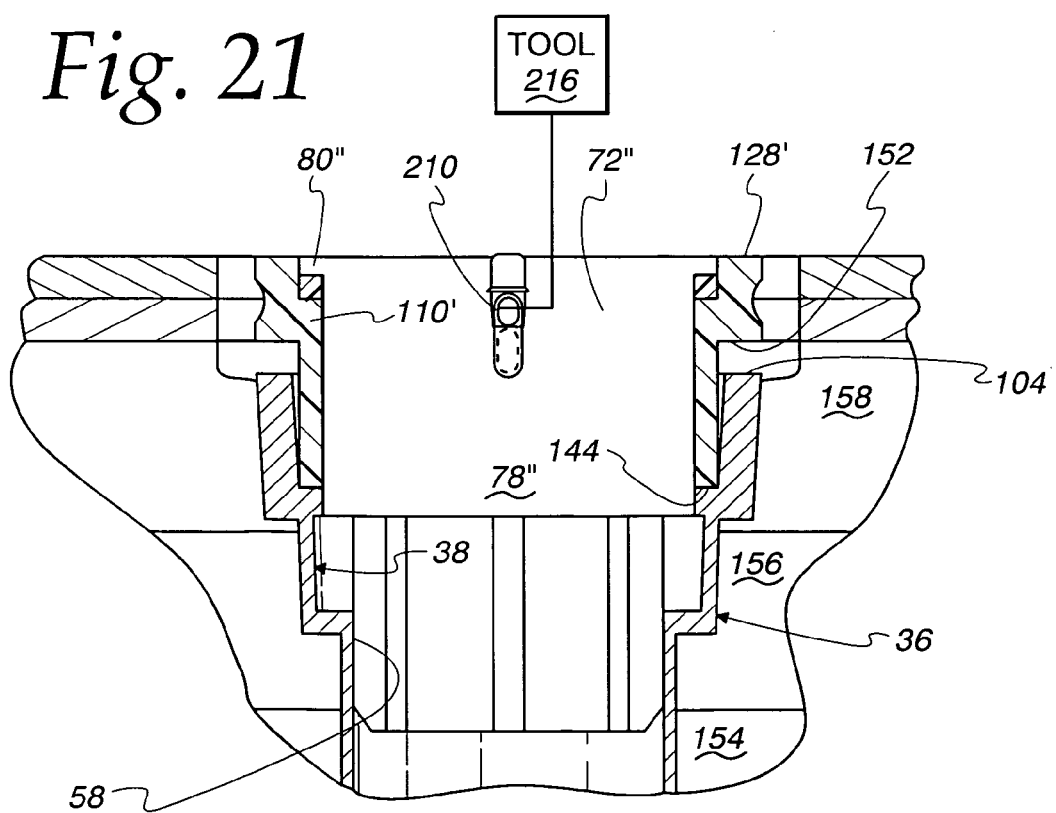

Thereafter, as shown in FIG. 21, the plug component 72" is pressed into the component 110' and the communication passage 38 so as to be frictionally held by the surface 58. The plug component 72" and component 110' are frictionally held together at the sections 78", 80".

As shown in FIG. 22, the filler 132 is then poured into the void 130' in an annular pattern conformingly against and around parts of the components. As shown in FIG. 23, the filler 132 is allowed to set, whereupon the procedure is completed. In this particular method, there is a vertical gap maintained between the edge 104 and surface 152. The filler 132 moves into this gap, thereby to effect a more positive interlocking of components through the filler 132 and firmly hold the component 110' in place. The same steps would be performed when the spacer 106" is incorporated.

The inventive method, as described above, has important utility even if metallic components are used in place of some or all of the non-metallic components described throughout the disclosure herein.

The above method can be used to cover an opening through the exposed, upwardly facing surface 16 that defines an access opening to a conduit assembly 36', as shown in FIGS. 24 and 25, that is designed for a metal manhole cover 192 that blocks the access opening. The conduit assembly 36' has a bottom supporting flange 194 and a thickened support region 196 defining a receptacle 198 for the manhole cover 192. The receptacle 198 is bounded by an upwardly facing surface 200. The support region 196 terminates at a top edge 202.

The FIG. 24 installation corresponds generally to that shown in FIG. 8. That is, the top edge 202 of the conduit assembly 36' resides slightly below the surface 16. A component 110", preferably made of a non-metal material such as polyurethane, is placed over the top surface 102 so that a rim 114" bears upon the edge 202 and maintains the top 128" on the component 110" flush with the surface 16. Filler 132 is poured into a void 130" to secure/maintain the component 110" and conduit assembly 36' fixedly together and bind the component 110" to the surface material/asphalt. The filler 132 flows into the holding notch 136' to further enhance component connection. The top portion 134" of the filler 132 resides at the same height as the top 128", whereby the top 128" and top portion 134" make up part of the surface 16.

An annular spacer 106''', preferably made of a non-metal material such as polyurethane, is placed against the receptacle surface 200 and is dimensioned in a vertical direction so that the top surface 102''' on the manhole cover 192 is substantially flush with the surface 16, with the manhole cover 192 supported upon the annular spacer 106''', which in turn is supported upon the receptacle surface 200.

In FIG. 25, the field condition shown corresponds to that in FIG. 9, wherein the top edge 202 on the conduit assembly 36' is substantially below the grade of the surface 16. A component 110''', corresponding to the component 110', is placed directly against the receptacle surface 200 and held in place by the filler 132.

The manhole cover 192 is placed in the receptacle 146''' defined by the component 110'''. An annular spacer 106'''' is placed against an upwardly facing edge 148''' bounding the receptacle 146''', with the manhole cover 192 in turn being placed against the annular spacer 106'''.

To facilitate removal of the compression/friction fit plug component 72, a metal lifting plate 210 may be provided. The lifting plate 210 is embedded in the plug component 72, as during a molding process used to make the plug component 72. The lifting plate 210 has a bottom loop portion 212 that becomes encapsulated by the molded material and a top loop 214 that can be engaged by an appropriate tool 216 having a working end that can extend through the top loop 214 to allow an upward lifting force to be applied thereto.

A removable plug 218 can be snap fit to the plug component 72 to seal a top opening 220 through which access to the top loop 214 can be gained. Once in place, the plug 218 may be pried out with a screwdriver or other tool, when removal of the plug component 72 is required.

The inventive method can be practiced to effect installation of cover assemblies contemporaneously with the initial installation of conduit assemblies on roadways, on sidewalks, in parking lots, etc., at virtually any site on public or private property where access is desired to underground components and/or spaces. The method can alternatively be practiced to repair or reconstruct cover assemblies to address a changed field condition. Still further, the inventive cover assembly may be installed to eliminate metal components that have failed or are undesirable from the standpoint of cost, operation, or noise generation under load application.

The inventive concepts are generally the same, whether the cover assembly is small or large. That is, the structure and inventive concepts, described hereinabove for the valve cover, are interchangeable with those for the manhole cover throughout the detailed description herein.

The use of spacers of different dimensions permits a significant degree of system flexibility in terms of adapting the cover assembly to different field conditions. Further, polyurethane components lend themselves to on site modification, yet are highly effective in terms of their performance characteristics. These modifications may be effected as by selective grinding to vary height, diameter, or other dimension or shape.

Further, non-metallic parts, such as those made from polyurethane, lend themselves to being made with different dimensions, as a particular application may dictate.

While polyurethane has been described as a preferred material for the non-metallic parts, it is contemplated that wherever "polyurethane" and "non-metallic" parts are described hereinabove, an elastomer or other non-metallic material would be likewise suitable.

Potentially seamless and neat transition can be effected between cover assemblies and surrounding, upwardly exposed surfaces.

The foregoing disclosure of specific embodiments is intended to be illustrative of the broad concepts comprehended by the invention.

The invention claimed is:

1. A method of covering an opening through an exposed upwardly facing surface that defines an access opening to a conduit assembly defining a communication passage to a below surface location, the method comprising the steps of:
   providing a cover assembly comprising at least one non-metallic component,
   the cover assembly comprising a plug component; and
   operatively joining the cover assembly with the conduit assembly so that the at least one non-metallic component is placed against a metal component on the conduit assembly and transmits weight forces applied to at least one of: a) the exposed upwardly facing surface; and b) a surface defined by the plug component on the cover assembly that blocks the access opening and is substantially flush with the exposed upwardly facing surface, to the metal component on the conduit assembly,
   the plug component selectively separable from the at least one non-metallic component with the at least one non-metallic component remaining against the metal component.

2. The method of covering an opening through an exposed upwardly facing surface according to claim 1 wherein the exposed upwardly facing surface is part of a roadway for vehicular traffic.

3. The method of covering an opening through an exposed upwardly facing surface according to claim 1 wherein the step of operatively joining the cover assembly comprises press fitting the plug component within a surface of the conduit assembly extending around the communication passage.

4. The method of covering an opening through an exposed upwardly facing surface according to claim 3 wherein the surface of the conduit assembly extending around the communication passage has a stepped diameter with vertically spaced surface portions with different diameters and the step of press fitting the plug component comprises press fitting the plug component within each of the vertically spaced surface portions.

5. The method of covering an opening through an exposed upwardly facing surface according to claim 3 wherein the plug component comprises a single molded polyurethane piece that is press fit to the surface of the conduit assembly extending around the communication passage and defines the surface that blocks the access opening and is substantially flush with the exposed upwardly facing surface.

6. The method of covering an opening through an exposed upwardly facing surface according to claim 5 wherein the step of operatively joining the cover assembly comprises abutting the plug component to an upwardly facing surface on the conduit assembly.

7. The method of covering an opening through an exposed upwardly facing surface according to claim 6 wherein the step of operatively joining the cover assembly comprises placing an annular spacer captively between vertically oppositely facing surfaces on the plug component and conduit assembly.

8. The method of covering an opening through an exposed upwardly facing surface according to claim 1 wherein the step of operatively joining the cover assembly comprises operatively joining the cover assembly so that the at least one non-metallic component is separate from the plug component and defines a part of the exposed upwardly facing surface.

9. The method of covering an opening through an exposed upwardly facing surface according to claim 8 wherein the step of operatively joining the cover assembly comprises providing a filler in an annular pattern conformingly against and around parts of the at least one non-metallic component and conduit assembly to maintain the at least one non-metallic component and conduit assembly together.

10. The method of covering an opening through an exposed upwardly facing surface according to claim 9 wherein the step of providing a filler comprises providing a filler that defines a part of the exposed upwardly facing surface.

11. The method of covering an opening through an exposed upwardly facing surface according to claim 1 wherein the step of operatively joining the cover assembly comprises the steps of: placing a locator assembly in operative relationship with the conduit assembly; applying at least one layer of material over the conduit assembly, a part of the locator assembly, and a sub-surface around the conduit assembly: a) to define the exposed upwardly facing surface; and b) so that a part of the locator assembly is detectable to identify a location of the conduit assembly; forming the access opening through the upwardly facing surface and at least one layer; and directing the at least one non-metallic component through the access opening to thereby place the at least one non-metallic component against the metallic component.

12. The method of covering an opening through an exposed upwardly facing surface according to claim 11 further comprising the step of separating the locator assembly from the conduit assembly.

13. The method of covering an opening through an exposed upwardly facing surface according to claim 11 wherein the step of placing a locator assembly comprises placing a locator assembly in operative relationship so that a portion of the locator assembly projects upwardly through the at least one layer of material.

14. The method of covering an opening through an exposed upwardly facing surface according to claim 13 wherein the portion of the detector assembly projects upwardly at a vertical center line for the communication passage and further comprising the step of using the portion of the locator assembly that projects upwardly to identify a location for the access opening to be formed to be concentric with the communication passage.

15. The method of covering an opening through an exposed upwardly facing surface according to claim 14 wherein the step of forming the access opening comprises forming the access opening using a rotary boring bit.

16. The method of covering an opening through an exposed upwardly facing surface according to claim 1 wherein the step of providing a cover assembly comprises providing a metal component that defines the surface that blocks the access opening.

17. The method of covering an opening through an exposed upwardly facing surface according to claim 1 wherein the step of providing a cover assembly comprises providing a cover assembly with at least one non-metallic component made from a polyurethane material.

18. The method of covering an opening through an exposed upwardly facing surface according to claim 1 wherein the step of providing a cover assembly comprises providing a metal component that defines the surface that blocks the access opening and the step of operatively joining the cover assembly comprises placing the non-metallic component captively between vertically facing surfaces on the metal component that defines the surface that blocks the access opening and the conduit assembly.

19. The method of covering an opening through an exposed upwardly facing surface according to claim 1 wherein the step of providing a cover assembly comprises providing a metal component that defines the surface that blocks the access opening and the step of operatively joining the cover assembly comprises operatively joining the cover assembly so that the non-metallic component defines a part of the exposed upwardly facing surface.

20. The method of covering an opening through an exposed upwardly facing surface according to claim 19 wherein the step of operatively joining the cover assembly comprises providing a filler around parts of the non-metallic component and conduit assembly to secure the non-metallic component in place.

21. A method of covering an opening through an exposed upwardly facing surface that defines an access opening to a conduit assembly defining a communication passage to a below surface location, the method comprising the steps of:
    providing a cover assembly comprising at least one non-metallic component and a removable plug component that blocks the access opening; and
    operatively joining the cover assembly with the conduit assembly so that the at least one non-metallic component is placed against a metal component on the conduit assembly and transmits weight forces applied to the exposed upwardly facing surface to the metal component on the conduit assembly,
    wherein the at least one non-metallic component is substantially flush with the exposed, upwardly facing surface.

22. The method of covering an opening through an exposed upwardly facing surface according to claim 21 wherein the at least one non-metallic component comprises polyurethane.

* * * * *